United States Patent
Tachiiwa et al.

(10) Patent No.: US 12,079,762 B2
(45) Date of Patent: Sep. 3, 2024

(54) INFORMATION PROCESSING DEVICE, INFORMATION PROCESSING METHOD, AND INFORMATION PROCESSING SYSTEM

(71) Applicant: KDDI CORPORATION, Tokyo (JP)

(72) Inventors: Masayuki Tachiiwa, Tokyo (JP); Tomoaki Matsuki, Tokyo (JP); Hiroshi Kawana, Tokyo (JP)

(73) Assignee: KDDI CORPORATION, Tokyo (JP)

(*) Notice: Subject to any disclaimer, the term of this patent is extended or adjusted under 35 U.S.C. 154(b) by 247 days.

(21) Appl. No.: 17/460,970

(22) Filed: Aug. 30, 2021

(65) Prior Publication Data
US 2022/0207476 A1    Jun. 30, 2022

(30) Foreign Application Priority Data
Dec. 28, 2020  (JP) .................... 2020-219419

(51) Int. Cl.
G06Q 10/0833   (2023.01)
G06Q 10/0832   (2023.01)
G07C 1/32      (2006.01)

(52) U.S. Cl.
CPC ..... *G06Q 10/0833* (2013.01); *G06Q 10/0832* (2013.01); *G07C 1/32* (2013.01)

(58) Field of Classification Search
USPC ........................................... 705/333
See application file for complete search history.

(56) References Cited

U.S. PATENT DOCUMENTS

2005/0060165 A1* 3/2005 Knight .................. G06Q 10/08
                                                    705/333
2012/0130916 A1* 5/2012 Neal .................. G06Q 10/0832
                                                    707/802

(Continued)

FOREIGN PATENT DOCUMENTS

CN       105117889 A    12/2015
JP       2013-133198 A   7/2013

(Continued)

OTHER PUBLICATIONS

Sawadsitang et al., Joint Ground and Aerial Package Delivery Services: A Stochastic Optimization Approach, Aug. 14, 2018, Transactions on Intelligent Transportation Systems 2018, pp. 1-14. https://arxiv.org/abs/1808.04617. (Year: 2018).*

(Continued)

*Primary Examiner* — Jeff Zimmerman
*Assistant Examiner* — Hunter A Molnar
(74) *Attorney, Agent, or Firm* — Foley & Lardner LLP

(57) ABSTRACT

A user can receive an article even when the user of a delivery destination is absent. An information processing device includes: a storage unit configured to store article identification information, article name information, delivery destination user identification information, delivery destination information, and arrival date and time information in association with each other; a notification unit configured to notify a delivery destination information terminal used by the delivery destination user of an arrival date and time before the moving body starts to move to deliver the delivery target article to the delivery destination; and an information receiving unit configured to store housing place identification information in the storage unit when the housing place identification information and information are received, in which the notification unit notifies the delivery destination (Continued)

information terminal of the article name of the delivery target article and the housing place.

13 Claims, 5 Drawing Sheets

(56) References Cited

U.S. PATENT DOCUMENTS

| | | | |
|---|---|---|---|
| 2015/0046362 A1* | 2/2015 | Muetzel | G06Q 10/08 705/341 |
| 2016/0171435 A1* | 6/2016 | Newton | G06Q 10/0833 705/333 |
| 2017/0185961 A1* | 6/2017 | Shiryan | G06Q 10/0838 |
| 2017/0372263 A1* | 12/2017 | Kim | G06Q 10/08 |
| 2018/0374031 A1 | 12/2018 | He et al. | |
| 2019/0041852 A1* | 2/2019 | Schubert | G06Q 10/0836 |
| 2019/0130349 A1 | 5/2019 | Ferguson et al. | |
| 2020/0167722 A1* | 5/2020 | Goldberg | G06Q 10/0832 |
| 2020/0258035 A1* | 8/2020 | Fujisawa | G06Q 10/0833 |
| 2020/0355572 A1 | 11/2020 | Priest | |
| 2021/0182787 A1* | 6/2021 | Mouli | G06Q 10/0838 |

FOREIGN PATENT DOCUMENTS

| | | |
|---|---|---|
| JP | 2016-153337 A | 8/2016 |
| JP | 2017-151846 A | 8/2017 |
| JP | 2017-534101 A | 11/2017 |
| JP | 2018-036766 A | 3/2018 |
| JP | 2018-045643 A | 3/2018 |
| JP | 2018-081704 A | 5/2018 |
| JP | 2018-097444 A | 6/2018 |
| JP | 2018-180949 A | 11/2018 |
| JP | 2018-195205 A | 12/2018 |
| JP | 2019-505875 A | 2/2019 |
| JP | 2019-103856 A | 6/2019 |
| JP | 2019-159487 A | 9/2019 |
| JP | 2020-135229 A | 8/2020 |
| JP | 2020-166505 A | 10/2020 |
| WO | WO-2016/039882 A1 | 3/2016 |
| WO | WO-2017/091685 A1 | 6/2017 |
| WO | WO-2018094019 A1 * | 5/2018 ........... B64C 39/024 |
| WO | WO-2019/146576 A1 | 8/2019 |

OTHER PUBLICATIONS

Office Action issued in corresponding Japanese Application No. 2021-163475, dated Aug. 9, 2022, with English translation (7 pages).

Office Action issued in corresponding Japanese Patent Application No. 2020-219419 dated Apr. 20, 2021 with English translation.

Office Action issued in corresponding Japanese Application No. 2021-163475 dated Jan. 18, 2022 with English translation.

Office Action issued in corresponding Chinese Application No. 202110987752.1 dated Jun. 5, 2024 (25 pages).

* cited by examiner

FIG. 4

| TRANSACTION ID | ARTICLE ID | ARTICLE NAME | DELIVERY DESTINATION USER ID | DELIVERY DESTINATION | ARRIVAL DATE AND TIME | HOUSING PLACE ID |
|---|---|---|---|---|---|---|
| 001 | P001 | BOOK | D100 | A | 12/10 16:00 | LA001 |
| 002 | P002 | MISCELLANEOUS ITEM | D101 | B | 12/10 18:30 | LB002 |
| 003 | P003 | MISCELLANEOUS ITEM | D102 | C | 12/11 10:00 | LC003 |
| : | : | : | : | : | : | : |

INFORMATION PROCESSING DEVICE, INFORMATION PROCESSING METHOD, AND INFORMATION PROCESSING SYSTEM

BACKGROUND OF THE INVENTION

Field of the Invention

The present invention relates to an information processing device, an information processing method, and an information processing system.

Priority is claimed on Japanese Patent Application No. 2020-219419, filed Dec. 28, 2020, the content of which is incorporated herein by reference.

Description of Related Art

Conventionally, a delivery system that delivers an article to a delivery destination using an unmanned flying object is known (for example, see Japanese Unexamined Patent Application, First Publication No. 2016-153337).

SUMMARY OF THE INVENTION

In a case in which the conventional technology is used, a moving body delivering an article needs to return the corresponding article to a delivery source when a user at a delivery destination of the article is absent. As a result, there is a problem in that the user at the delivery destination is unable to receive the article.

The present invention is realized in view of such points, and an object thereof is to enable a user to receive an article even when the user at a delivery destination is absent.

According to a first aspect of the present invention, there is provided an information processing device including: a storage unit configured to store article identification information used for identifying a delivery target article that is a target to be delivered, article name information representing an article name of the delivery target article, delivery destination user identification information used for identifying a delivery destination user of the delivery target article, delivery destination information representing a delivery destination of the delivery target article, and arrival date and time information representing a date and time at which a moving body delivering the delivery target article arrives at the delivery destination in association with each other; a notification unit configured to notify a delivery destination information terminal used by the delivery destination user represented by the delivery destination user identification information of an arrival date and time represented by the arrival date and time information before the moving body starts to move to deliver the delivery target article represented by the article identification information to the delivery destination represented by the delivery destination information; and an information receiving unit configured to store housing place identification information in the storage unit in association with the article identification information when the housing place identification information used to identify a housing place of the delivery target article delivered to the delivery destination and information used for specifying the delivery target article are received, in which the notification unit notifies the delivery destination information terminal of the article name of the delivery target article corresponding to the article identification information and the housing place corresponding to the housing place identification information.

The storage unit may store moving body identification information used for identifying the moving body in association with the article identification information, and, when movement stop information representing cessation of movement of the moving body corresponding to the moving body identification information is stored in the storage unit, the notification unit may notify the delivery destination information terminal used by the delivery destination user corresponding to the delivery destination user identification information associated with the moving body identification information of a change of a delivery schedule of the delivery target article.

The storage unit may store moving body identification information used for identifying the moving body in association with the article identification information, and, when movement stop information representing cessation of movement of the moving body corresponding to the moving body identification information is stored in the storage unit, the notification unit may notify the delivery destination information terminal of at least one of information used for accepting an instruction of selection of a delivery means different from the moving body and information used for accepting a delivery stop instruction.

The storage unit may store delivery source identification information used for identifying a delivery source user of the delivery target article in association with the article identification information, the information receiving unit may receive unlock date and time information representing a date and time at which the housing place corresponding to the housing place identification information is unlocked, and the notification unit may notify a delivery source information terminal used by the delivery source user corresponding to the delivery source identification information of the unlock date and time information.

In a case in which the information receiving unit has not received the unlock date and time information until a predetermined period elapses after the arrival date and time represented by the arrival date and time information, the notification unit may notify at least one of the delivery source information terminal and the delivery destination information terminal of time-over information representing that the delivery target article has not been taken out of the housing place.

The information receiving unit may receive delivery instruction information representing an instruction for delivery of the delivery target article to a place designated by the delivery destination user, and, in a case in which the information receiving unit receives the delivery instruction information, the notification unit may notify an information terminal used by a person delivering the delivery target article from the housing place to the place designated by the delivery destination user of unlock information used for unlocking the housing place.

The information receiving unit may receive change information representing that an arrival date and time of the moving body has been changed, and, when the information receiving unit receives the change information, the notification unit may notify a delivery source information terminal used by a delivery source user and the delivery destination information terminal of a changed arrival date and time represented by the change information.

When the delivery destination user identification information, the article identification information, and return notification information representing return of the delivery target article corresponding to the article identification information are received, the information receiving unit may cause the storage unit to store the delivery destination user identification information, the article identification information, and the return notification information that have been received, and the notification unit notifies a delivery source information terminal used by a delivery source user of return of the delivery target article corresponding to the article identification information from the delivery destination user represented by the delivery destination user identification information.

The storage unit may store weather information of at least one of a delivery source and a delivery destination of the delivery target article or availability information representing availability of taking-off at the delivery source, or availability of landing at the delivery destination in association with the article identification information, and, in a case in which the weather information or the availability information satisfies a predetermined condition, the notification unit may notify at least one of the delivery source information terminal used by the delivery source user and the delivery destination information terminal of information relating to the change of the arrival date and time.

According to a second aspect of the present invention, there is provided an information processing method using a computer, the information processing method including: causing a storage unit to store article identification information used for identifying a delivery target article that is a target to be delivered, article name information representing an article name of the delivery target article, delivery destination user identification information used for identifying a delivery destination user of the delivery target article, delivery destination information representing a delivery destination of the delivery target article, and arrival date and time information representing a date and time at which a moving body delivering the delivery target article arrives at the delivery destination in association with each other; notifying a delivery destination information terminal used by the delivery destination user represented by the delivery destination user identification information of an arrival date and time represented by the arrival date and time information before the moving body starts to move to deliver the delivery target article represented by the article identification information to the delivery destination represented by the delivery destination information; storing housing place identification information in the storage unit in association with the article identification information when the housing place identification information used for identifying a housing place of the delivery target article delivered to the delivery destination and information used for specifying the delivery target article are received; and notifying the delivery destination information terminal of the article name of the delivery target article corresponding to the article identification information and the housing place corresponding to the housing place identification information.

According to a third aspect of the present invention, there is provided an information processing system including: an information processing device that notifies an information terminal used by a delivery destination user of delivery completion information of a delivery target article that is a target to be delivered; and the information terminal that displays the delivery completion information received from the information processing device, the information processing device including: a storage unit configured to store article identification information used for identifying the delivery target article, article name information representing an article name of the delivery target article, delivery destination user identification information used for identifying a delivery destination user of the delivery target article, delivery destination information representing a delivery destination of the delivery target article, and arrival date and time information representing a date and time at which a moving body delivering the delivery target article arrives at the delivery destination in association with each other; a notification unit configured to notify the information terminal used by the delivery destination user represented by the delivery destination user identification information of an arrival date and time represented by the arrival date and time information before the moving body starts to move to deliver the delivery target article represented by the article identification information to the delivery destination represented by the delivery destination information; and an information receiving unit configured to store housing place identification information in the storage unit in association with the article identification information when the housing place identification information used for identifying a housing place of the delivery target article delivered to the delivery destination and information used for specifying the delivery target article are received, in which the notification unit notifies the information terminal of the article name of the delivery target article corresponding to the article identification information and the housing place corresponding to the housing place identification information, and the information terminal includes a display unit configured to display the arrival date and time, the article name, and the housing place notified from the information processing device.

According to the present invention, there is an advantage of a user being able to receive an article even when the user at a delivery destination is absent.

BRIEF DESCRIPTION OF THE DRAWINGS

FIG. 4 is a diagram illustrating an example of information stored by a storage unit 12 in association with each article ID.

DETAILED DESCRIPTION OF EMBODIMENTS

[Overview of Information Processing System S]

Figure 1:
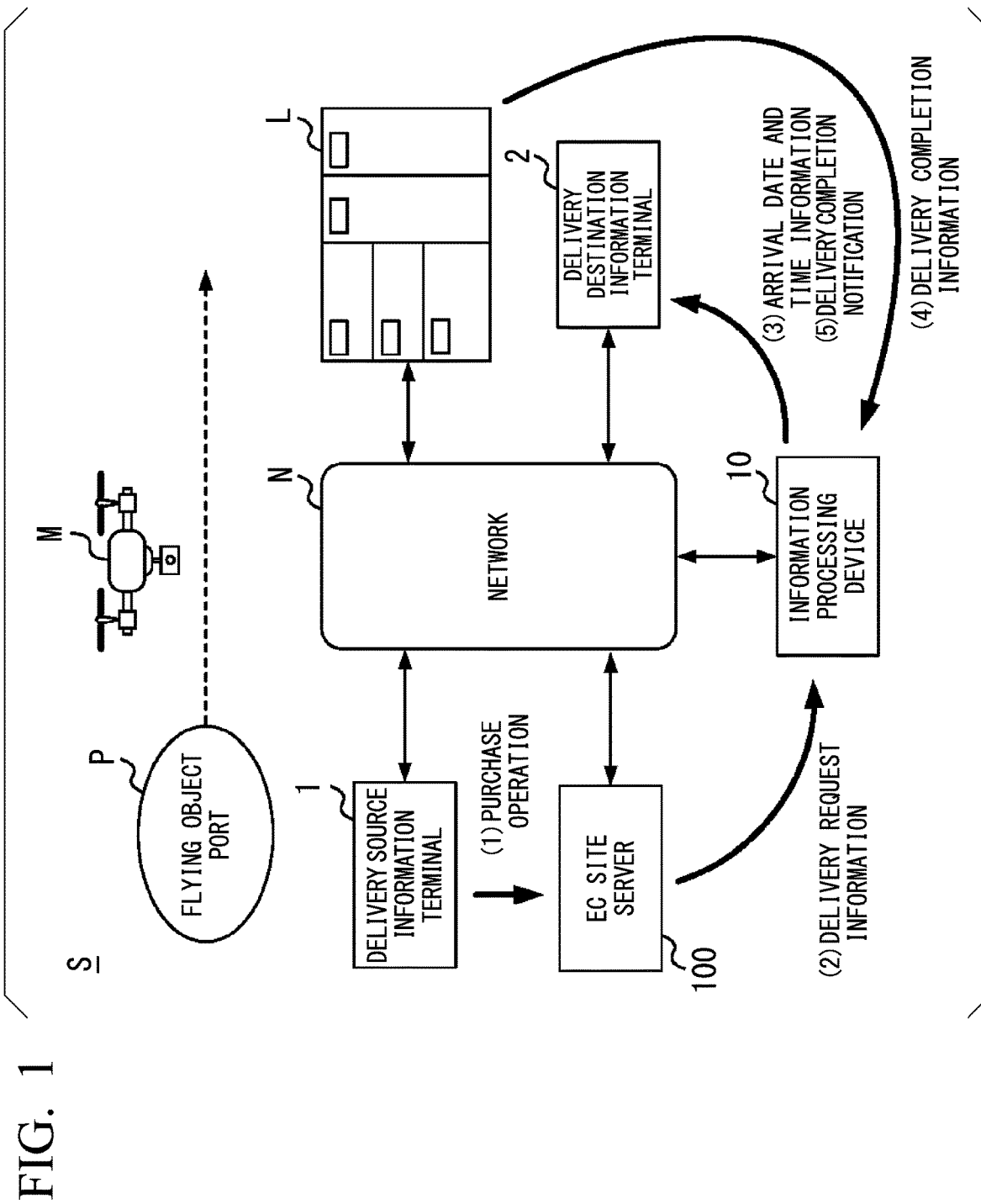
FIG. 1 is a diagram illustrating the configuration of an information processing system S.

FIG. 1 is a diagram illustrating the configuration of an information processing system S. The information processing system S includes one or more delivery source information terminals 1, one or more delivery destination information terminals 2, and an information processing device 10. In FIG. 1, an electronic commerce (EC) site server 100 that is managed by an operator operating a shopping site for selling articles is also illustrated. As illustrated in FIG. 1, the delivery source information terminal 1, the delivery destination information terminal 2, the information processing device 10, the EC site server 100, and a housing device L can transmit/receive data through a network N. For example, the network N is an intranet or the Internet. The network N may include a radio network.

The information processing system S is a system that is used for notifying a recipient receiving an article (hereinafter, referred to as a "delivery destination user") of a date and time at which a moving body M delivering an article arrives at a delivery destination and a housing place in which the article is housed at the delivery destination by the moving body M. For example, the moving body M is a flying object such as a drone, a vehicle, or a ship. In the description presented below, a case in which the moving body M is a flying object will be described as an example. As an example, the moving body M moves through a predetermined section at a date and time that is set in advance in accordance with an operation schedule.

FIG. 1 illustrates a case in which the moving body M flies from a flying object port P that is a delivery source to a housing device L that is a delivery destination. For example, the housing device L is a home delivery locker and includes a plurality of housing places. For example, the housing device L has a function of notifying the information processing device 10 of a housing place of an article through the network N. For example, a delivery destination of the moving body M is a housing device L that is installed at a place closest from an address of the delivery destination user who will receive an article among a plurality of housing devices L. For example, the delivery destination is determined on the basis of an address set by a user who has purchased an article at a shopping site.

For example, the delivery source information terminal 1 and the delivery destination information terminal 2 are computers or smartphones. For example, the delivery source information terminal 1 is a terminal that is used by a delivery source user for purchasing an article at a shopping site. The delivery source user purchases an article at a shopping site by operating the delivery source information terminal 1. The delivery destination information terminal 2 is a terminal that is used by a delivery destination user who receives an article purchased by a delivery source user. In FIG. 1, although a case in which the delivery source information terminal 1 and the delivery destination information terminal 2 are different from each other is illustrated, in a case in which a delivery source user receives delivery of an article at his or her address, the delivery source information terminal 1 may function as the delivery destination information terminal 2.

In a case in which a user has purchased an article by operating the delivery source information terminal 1, the EC site server 100 generates transaction identification information used for identifying this transaction (hereinafter, referred to as a "transaction ID"). The EC site server 100 transmits delivery request information, which includes the generated transaction 1D, article identification information used for identifying an article purchased by a user (hereinafter, referred to as an "article ID"), and information used by the information processing device 10 for specifying a delivery source and a delivery destination, to the information processing device 10.

The EC site server 100 has a user database in which information of users using a shopping site is registered for providing information that is used by the information processing device 10 for specifying a delivery source and a delivery destination. In the user database, delivery source identification information used for identifying a delivery source user purchasing an article at a shopping site (hereinafter, referred to as a "delivery source ID"), delivery source name information representing a name of the delivery source user, delivery source address information representing an address of the delivery source user, delivery source information terminal identification information used for identifying a delivery source information terminal 1 used by the delivery source user (hereinafter, referred to as a "delivery source information terminal ID"), delivery destination user identification information used for identifying a delivery destination user (hereinafter, referred to as a "delivery destination user ID"), delivery destination name information representing a name of the delivery destination user, delivery destination user address information representing an address of the delivery destination user, and information terminal identification information used for identifying a delivery destination information terminal 2 used by the delivery destination user (hereinafter, referred to as a "delivery destination information terminal ID") are associated with each other. In the user database, housing device identification information used for identifying a housing device L (hereinafter, referred to as a "housing device ID") may be associated with the delivery destination user ID.

The EC site server 100 generates delivery request information including a transaction ID, an article ID, article name information, a delivery source ID, delivery source name information, delivery source address information, a delivery source information terminal ID, a delivery destination user ID, delivery destination name information, delivery destination user address information, and a delivery destination information terminal ID by referring to the user database and transmits the generated delivery request information to the information processing device 10. In the delivery request information, delivery date and time information representing a date and time (a desired date and time) at which the moving body M delivering an article is to arrive at the delivery destination may be included.

The information processing device 10 is a device that executes various processes used for managing the moving body M and, for example, is a computer. The information processing device 10 may be a single computer or, for example, may be configured using a plurality of computers such as a cloud-type server. The information processing device 10 may include the function of the EC site server 100. The information processing device 10 stores operation schedules of one or more moving bodies M.

The information processing device 10 selects a housing device L that is a target for delivering a delivery target article among a plurality of housing devices L by referring to the delivery destination user address information included in the delivery request information received from the EC site server 100 and information representing positions of the housing devices L stored in advance. In addition, information relating to users (for example, the delivery destination user ID, the delivery destination name information, the delivery destination user address information, the delivery destination information terminal ID, and the housing device ID) may be stored in the information processing device 10, and the information processing device 10 may select a housing device L that is a target for delivering a delivery target article represented by the delivery request information by referring to the corresponding information.

The information processing device 10 selects a plurality of moving bodies M that can be operated up to the housing device L by referring to the operation schedules of the moving bodies M. The information processing device 10 may store operation schedules in advance or may acquire operation schedules from an external device that manages the operation schedules. In addition, the information processing device 10 selects one or more moving bodies M that can deliver the delivery target article among the plurality of moving bodies M that have been selected. For example, the information processing device 10 specifies one or more moving bodies M that can deliver the delivery target article among a plurality of moving bodies M that move up to the selected housing device L on the basis of at least one of the weight, the size, and the shape of the delivery target article.

The information processing device 10 may acquire information such as the weight, the size, the shape, or the like of a delivery target article from the EC site server 100 or may specify the weight, the size, or the shape of a delivery target article by referring to an article database in which each article and the weight, the size, or the shape are associated with each other. The information processing device 10 determines a moving body M to which a delivery target article is delivered by referring to operation schedules of one or more moving bodies M. The information processing device 10 selects a moving body M that arrives at a delivery destination at a date and time that is before a desired date and time represented by the delivery date and time information and is the closest to the desired date and time among dates and times at which one or more moving bodies M are operated toward a delivery destination. The information processing device 10 determines the date and time at which the corresponding moving body M arrives at the delivery destination as an arrival date and time. In addition, although details will be described below as a modified example, the information processing device 10 may acquire vacancy information representing a vacancy status of each housing place, determine whether or not there is a place that can house a delivery target article on the basis of a size of the delivery target article, and change an arrival date and time on the basis of a result of the determination and the operation schedule of the moving body M.

In this way, the information processing device 10 determines a date and time at which the moving body M delivering the delivery target article arrives at the housing device L that is a delivery destination by referring to the delivery request information received from the EC site server 100 and the operation schedule of the moving body M. The information processing device 10 transmits the determined arrival date and time and the article name of the delivery target article to the delivery destination information terminal 2.

After the delivery target article is delivered to the housing device L by the moving body M, the information processing device 10 receives delivery completion information from the housing device L. In the delivery completion information, housing place identification information used for identifying a housing place in which the delivery target article is housed by the moving body M (hereinafter, referred to as a "housing place ID") and a transaction ID are included. In the housing place ID, a housing device ID used for identifying the housing device L and an in-device ID used for identifying a housing place in the housing device L are included. In the delivery completion information, at least one of an article name, an article ID, and a delivery completion date and time of a delivery target article may be included together with the housing place ID. In addition, the information processing device 10 may receive delivery completion information from the moving body M.

The information processing device 10 specifies a housing device L and a housing place in the housing device L on the basis of the housing place ID included in the received delivery completion information and transmits information representing the specified housing place to the delivery destination information terminal 2. The information processing device 10 may specify a delivery target article name on the basis of the transaction ID included in the delivery completion information and transmit the specified article name to the delivery destination information terminal 2. In addition, the information processing device 10 may transmit a delivery completion date and time to the delivery destination information terminal 2. A delivery destination user may cause the delivery destination information terminal 2 to display at least one of the delivery place, the article name, and the delivery completion date and time received from the information processing device 10 using application software that can be executed by the delivery destination information terminal 2.

Hereinafter, an overview of operations of the information processing system S will be described with reference to FIG. 1. A user of the delivery source information terminal 1 purchases an article at a shopping site by operating the delivery source information terminal 1 ((1) in FIG. 1). When the EC site server 100 transmits delivery request information to the information processing device 10 ((2) in FIG. 1), the information processing device 10 determines a date and time at which the delivery target article will arrive at a delivery destination by referring to the received delivery request information and the operating schedule of the moving body M. The information processing device 10 transmits an article name of the delivery target article and a date and time at which the delivery target article will arrive at the delivery destination to the delivery destination information terminal 2 used by the delivery destination user ((3) in FIG. 1).

The moving body M delivers the delivery target article from the flying object port P to the housing device L and stores the delivery target article in a housing place in which no other articles are stored among a plurality of housing places included in the housing device L. The housing device L recognizes a housing place ID representing a housing place at which the delivery target article has been stored by the moving body M. A slip on which a barcode, a QR code (a registered trademark), or the like representing a transaction ID is printed is attached to a delivery target article, and the housing device L recognizes a transaction ID by reading the corresponding transaction ID. The housing device L transmits delivery completion information including the recognized transaction ID and the housing place ID to the information processing device 10 ((4) in FIG. 1).

The information processing device 10 transmits a delivery completion notification representing an article name of a delivery target article corresponding to the transaction ID received from the housing device L, a housing place corresponding to the housing place ID, a delivery completion date and time, and the like to the delivery destination information terminal 2 ((5) in FIG. 1). The delivery destination information terminal 2 displays the article name, the housing place, the delivery completion date and time, and the like received from the information processing device 10.

By causing the information processing device 10 and the delivery destination information terminal 2 to operate as described above, the delivery destination user can notice a date and time and a place at which the delivery target article has been stored in the housing device L. As a result, a delivery destination user can receive an article at a time that is appropriate for the delivery destination user even when he or she is absent at a time and date at which the delivery target article has been arrived. In the description presented above, although a case in which the housing device L transmits a transaction ID and a housing place ID to the information processing device 10 has been illustrated, the information processing device 10 may receive a transaction ID and a housing place ID from the moving body M that has stored the delivery target article in the housing device L.

[Configuration of Delivery Destination Information Terminal 2]

Figure 2:
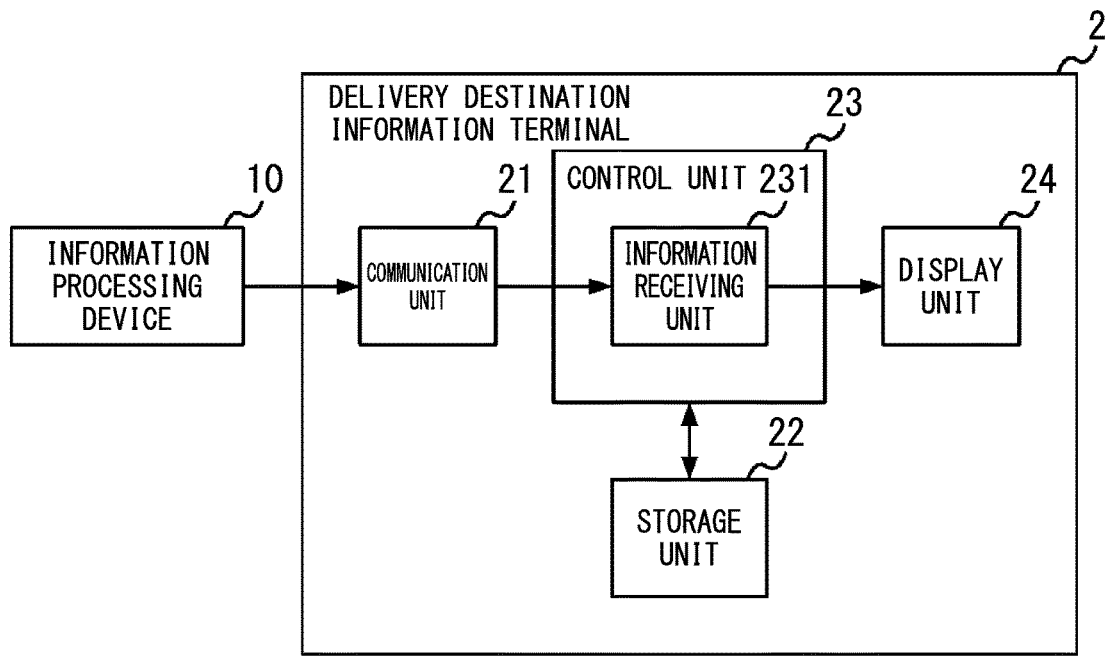
FIG. 2 is a diagram illustrating the configuration of a delivery destination information terminal 2.

FIG. 2 is a diagram illustrating the configuration of the delivery destination information terminal 2. The delivery destination information terminal 2 has a communication unit 21, a storage unit 22, a control unit 23, and a display unit 24. The control unit 23 has an information receiving unit 231. The delivery destination information terminal 2 displays text information included in a delivery completion notification received from the information processing device 10.

The communication unit 21 includes a communication device that is used for receiving information through the network N. For example, the communication device is a local area network (LAN) controller or a wireless LAN controller. The storage unit 22 has a storage medium such as a read only memory (ROM), a random access memory (RAM), or a solid state drive (SSD). The storage unit 22 stores a program that is executed by the control unit 23.

For example, the control unit 23 is a central processing unit (CPU). The control unit 23 functions as an information receiving unit 231 by executing a program stored in the storage unit 22. The information receiving unit 231 receives a delivery completion notification transmitted by the information processing device 10 through the communication unit 21.

For example, the display unit 24 has a display device such as a liquid crystal display or an organic electroluminescence (EL). The display unit 24 displays the arrival date and time, the article name, and the housing place of which the display unit 24 is notified from the information processing device 10. The display unit 24 displays an article name represented by the article name information, an arrival date and time represented by the arrival date and time information, and the housing place represented by the housing place ID, which are included in the delivery completion notification received by the information receiving unit 231.

[Configuration of Information Processing Device 10]

Figure 3:
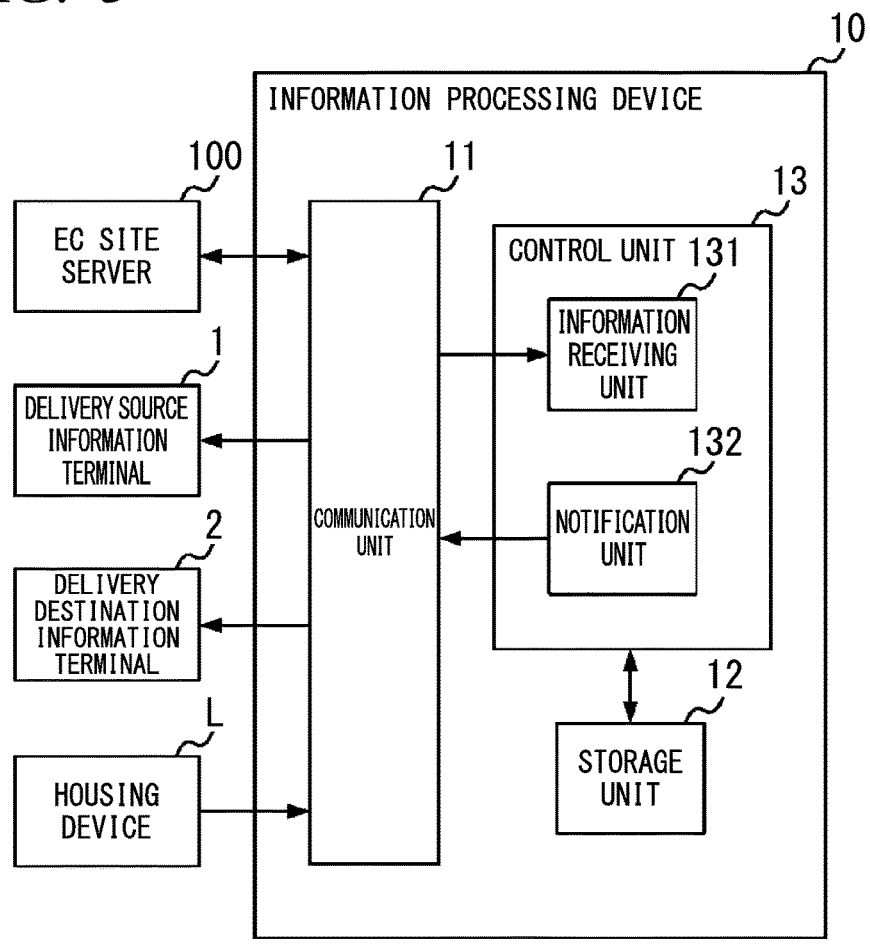
FIG. 3 is a diagram illustrating the configuration of an information processing device 10.

FIG. 3 is a diagram illustrating the configuration of the information processing device 10. The information processing device 10 has a communication unit 11, a storage unit 12, and a control unit 13. The control unit 13 has an information receiving unit 131 and a notification unit 132.

The communication unit 11 includes a communication device that is used for transmitting/receiving information through the network N. For example, the communication device is a LAN controller or a wireless LAN controller. The storage unit 12 has a storage medium such as a ROM, a RAM, or an SSD. The storage unit 12 stores a program that is executed by the control unit 13.

The storage unit 12 stores delivery request information received from the EC site server 100. The storage unit 12 identifies a transaction such as a purchase of an article or the like and stores a transaction ID used for specifying a delivery target article, an article ID used for identifying the delivery target article that is a target for delivery, article name information representing an article name of the delivery target article, a delivery destination user ID used for identifying a delivery destination user of the delivery target article, delivery destination information representing a delivery destination of the delivery target article, and arrival date and time information representing a date and time at which a moving body delivering the delivery target article arrives at the delivery destination in association with each other. The storage unit 12 stores the housing place ID received from the housing device L in association with the transaction ID.

FIG. 4 is a diagram illustrating an example of information stored by the storage unit 12 in association with each transaction ID. In FIG. 4, a transaction ID, an article ID of a delivery target article, an article name of the delivery target article, a delivery destination user ID, a delivery destination of the delivery target article, an arrival date and time at which a moving body M arrives at the delivery destination, and a housing place ID are associated with each other.

For example, in a transaction represented by a transaction ID "001" represented in FIG. 4, the article ID is "P001", the article name is "book", and the article is stored in a housing place included in a housing device of a delivery destination "A" at "December 10 16:00". A housing place of a delivery target article represented by the article ID "P001" is a housing place represented by a housing place ID "LA001".

In a case in which a plurality of moving bodies M deliver articles, the storage unit 12 may store moving body identification information used for identifying a moving body M (hereinafter, referred to as a "moving body ID") in association with an article ID. In a case in which a plurality of delivery source users deliver articles, the storage unit 12 may store a delivery source ID used for identifying a delivery source user of a delivery target article in association with an article ID.

The storage unit 12 may store weather information of at least one of a delivery source and a delivery destination of a delivery target article, or availability information representing taking-off availability at a delivery source or landing availability at a delivery destination in association with a transaction ID. The storage unit 12 may store state information representing a state of a moving body M and position information representing a position of the moving body M in association with a transaction ID. For example, the state information is information that representing whether a moving body M is "stopped" or "moving". In a case in which a moving body M stops moving, the state information may represent "cessation of movement".

For example, the control unit 13 is a CPU. The control unit 13 functions as the information receiving unit 131 and the notification unit 132 by executing a program stored in the storage unit 12. The information receiving unit 131 receives delivery request information from the EC site server 100 and stores the received delivery request information in the storage unit 12.

The information receiving unit 131 receives various kinds of information required for delivering a delivery target article and various kinds of information representing a delivery status of the delivery target article through the communication unit 11. For example, the information receiving unit 131 receives delivery request information from the EC site server 100. In addition, after delivery of the delivery target article is completed, the information receiving unit 131 receives delivery completion information from the housing device L. When the delivery completion information is received from the housing device L, on the basis of a transaction ID included in the delivery completion information, the information receiving unit 131 causes the storage unit 12 to store a housing place ID and the arrival date and time included in the delivery completion information in association with an article ID corresponding to the transaction ID.

For example, in a case in which a delivery target article corresponding to a transaction ID "001" is housed in the housing place corresponding to the housing place ID "LA001" illustrated in FIG. 4, the information receiving unit 131 causes the storage unit 12 to store the housing place ID "LA001" and the arrival date and time in association with an article ID corresponding to the transaction ID "001" received from the housing device L. In this way, a state in which the article, and the housing place, and the arrival date and time are stored in the storage unit 12 in association with each other is formed.

In a case in which a delivery destination user opens a housing place, the information receiving unit 131 receives unlock date and time information representing a date and time, at which the housing place corresponding to the housing place 1D has been unlocked, from the housing device L. In addition, the information receiving unit 131 may receive reception confirmation information, which indicates that a delivery destination user has received a delivery target article, from the housing device L in association with unlock date and time information. For example, the reception confirmation information is information that is notified from a housing device L in accordance with an article name of a delivery target article being displayed on a display included in the housing device L and a delivery destination user pressing display "confirmation" corresponding to the displayed article name.

In addition, the information processing device 10 may accept a change of the delivery destination. In a case in which a delivery destination user gives an instruction for delivery of the delivery target article to a place different from the housing device L, the information receiving unit 131 receives delivery instruction information representing an instruction for delivery of the delivery target article to a place designated by the delivery destination user, from the delivery destination information terminal 2. For example, the information receiving unit 131 receives the delivery instruction information from the delivery destination information terminal 2. For example, the place designated by the delivery destination user is a house of the delivery destination user.

The information processing device 10 can accept return of the delivery target article. In a case in which a delivery destination user gives an instruction for return of the delivery target article, the information receiving unit 131 receives a delivery destination user ID, an article ID, return notification information indicating that a delivery target article corresponding to the article ID is to be returned, and a housing place 1D corresponding a place, in which a delivery target article to be returned is housed, from the delivery destination information terminal 2. When such information is received, the information receiving unit 131 may cause the storage unit to store the delivery destination user ID, the article ID, and the return notification information. The information processing device 10 accepts return with a condition of the housing place being within a predetermined period from an unlocked date and time of the housing place and, in a case in which return notification information is received after elapse of a predetermined period, the information receiving unit 131 may transmit information indicating that return cannot be performed to the delivery destination information terminal 2.

However, in accordance with the state of the moving body M or the environmental state of the place to which the moving body M moves, there are cases in which the moving body M is unable to move as is scheduled. In such cases, the information processing device 10 may accept a change of the arrival date and time.

In a case in which the arrival date and time of the moving body M has been changed, the information receiving unit 131 receives change information indicating that the arrival date and time of the moving body M has been changed, for example, from the moving body M or an information terminal used by a manager of the moving body M. The change information is information indicating that the arrival date and time of the moving body M has been changed and, for example, is transmitted in a case in which the moving body M is unable to arrive at an arrival date and time represented by the arrival date and time information stored by the storage unit 12 due to maintenance of the moving body M or a change in the weather. The change information may include a changed arrival date and time. The information receiving unit 131 causes the storage unit 12 to store the received change information. For example, in a case in which change information of a delivery target article represented by the transaction ID "003" illustrated in FIG. 4 has been received, the information receiving unit 131 stores an arrival date and time represented by the change information and the transaction ID "003" in association with each other.

In a case in which at least one of state information representing whether the moving body M is stopped or moving and position information representing a position during flight of the moving body M has been received from the moving body M, the information receiving unit 131 may cause the storage unit 12 to store the state information or the position information that has been received. In a case in which a moving body ID, a delivery source ID, weather information of at least one of a delivery source and a delivery destination, or availability information representing availability of taking-off at the delivery source or availability of landing at the delivery destination has been received from the delivery source information terminal 1, the information receiving unit 131 may cause the storage unit 12 to store such information in association with the transaction 1D.

Before the moving body M starts to move to deliver a delivery target article represented by the article ID to a delivery destination represented by the delivery destination information, the notification unit 132 notifies a delivery destination information terminal 2 used by a delivery destination user represented by the delivery destination user ID of an arrival date and time represented by the arrival date and time information. For example, after a time at which the moving body M will start to fly for delivering the delivery target article to the housing device L is determined by a user of the delivery source information terminal 1, the notification unit 132 notifies the delivery destination information terminal 2 of the arrival date and time of the moving body M between a time at which the information receiving unit 131 receives the arrival date and time information included in the delivery request information and the time at which the moving body M starts to fly.

The notification unit 132 notifies the delivery destination information terminal 2 of an article name of a delivery target article corresponding to the article ID and a housing place corresponding to the housing place ID. After the moving body M stores the delivery target article in the housing place, on the basis of the housing place ID and the transaction ID received from the housing device L by the information receiving unit 131, the notification unit 132 transmits article name information associated with the transaction ID, a position of the housing device L corresponding to the housing place ID, and a housing place in the housing device L to the delivery destination information terminal 2.

As described above, by notifying the delivery destination information terminal 2 of the article name of the delivery target article and the housing place storing the delivery target article using the notification unit 132, a delivery destination user can receive the delivery target article at a date and time that is appropriate for the delivery destination user even when he or she is absent at a scheduled arrival date and time.

When movement stop information indicating cessation of movement of a moving body M corresponding to a moving body 1D is stored in the storage unit 12, the notification unit 132 may notify a delivery destination information terminal 2 used by a delivery destination user corresponding to a delivery destination user ID associated with the moving body ID that the delivery schedule of the delivery target article has been changed. For example, in a case in which the moving body M stops flight due to breakdown, the notification unit 132 notifies a delivery destination information terminal 2 used by a delivery destination user of the delivery target article scheduled to be delivered by the moving body M that the arrival time of the moving body M has been changed. By causing the notification unit 132 to operate in this way, the delivery destination user can quickly acquire a time at which the delivery target article will be delivered even in a case in which the time at which the moving body M files has been changed.

When movement stop information indicating cessation of movement of a moving body M corresponding to a moving body ID is stored in the storage unit 12, the notification unit 132 may notify a delivery destination information terminal 2 of at least one of information used for accepting an instruction for selecting a delivery means different from the moving body M and information used for accepting a delivery stop instruction. For example, in a case in which the moving body M is a flying object, the delivery means different from the moving body M is a vehicle or a ship.

For example, in a case in which the information receiving unit 131 stores the movement stop information received from the delivery source information terminal 1 by the information receiving unit 131 in the storage unit 12, the notification unit 132 notifies the delivery destination information terminal 2 of information used for selecting a delivery means different from the moving body M on the basis of alternative delivery information representing alternative delivery means received in association with the movement stop information by the information receiving unit 131. For example, the alternative delivery information is "Ordinary flight 1" representing a delivery means that delivers a delivery target article using a vehicle and "Ordinary flight 2" representing a delivery means that delivers a delivery target article using a ship.

The notification unit 132 notifies the delivery destination information terminal 2 of information representing at least one of "Ordinary flight 1" and "Ordinary flight 2", which are alternatively delivery means represented by the alternative delivery information, and "Delivery stop" for stopping delivery without using the alternative delivery means. By displaying the information representing "Ordinary flight 1", "Ordinary flight 2", and "Delivery stop" received from the notification unit 132, the delivery destination information terminal 2 allows a user of the delivery destination information terminal 2 to select a delivery means different from the moving body M or stop of delivery. By causing the notification unit 132 to operate in this way, the delivery destination user can select delivery using an alternative means and delivery stop.

When movement stop information representing cessation of movement of a moving body M corresponding to the moving body ID is stored in the storage unit 12, the notification unit 132 may notify the delivery source information terminal 1 of at least one of the information used for accepting an instruction for selecting a delivery means different from the moving body M and the information used for accepting an instruction for stopping delivery. By causing the notification unit 132 to operate in this way, in a case in which a moving body M scheduled to perform delivery cannot be used, the delivery source user can select to perform delivery using an alternative means or notify the delivery destination user of stop of delivery.

When the information receiving unit 131 receives change information representing that the arrival date and time has been changed, the notification unit 132 may notify the delivery source information terminal 1 used by the delivery source user and the delivery destination information terminal 2 of a changed arrival date and time represented by the change information. By causing the notification unit 132 to operate in this way, the delivery destination user can quickly notice that the arrival date and time of the delivery target article has been changed. In addition, the notification unit 132 may notify the delivery source information terminal 1 that the changed date and time has been notified to the delivery destination information terminal 2. By causing the notification unit 132 to operate in this way, the delivery source user can notice that the changed arrival date and time has been notified to the delivery destination user.

In a case in which weather information representing the surrounding weather of the moving body M, or availability information representing taking-off availability at a delivery source or landing availability at a delivery destination satisfies a predetermined condition, the notification unit 132 may notify at least one of the delivery source information terminal 1 used by the delivery source user and the delivery destination information terminal 2 of information relating to change of the arrival date and time. The notification unit 132 determines whether or not the moving body M can perform delivery to the delivery destination on the basis of the weather information or the availability information stored in association with the transaction ID by the storage unit 12. For example, in a case in which the weather information represents a climate such as rain or snow or in a case in which the availability information represents that the moving body M is unable to fly, the notification unit 132 notifies of the date and time, at which the moving body M arrives, being changed or a changed arrival date and time.

In a case in which it is determined that the moving body M is unable to perform delivery to the delivery destination, the notification unit 132 notifies at least one of the delivery source information terminal 1 and the delivery destination information terminal 2 of change information that is information relating to change of the arrival date and time. By causing the notification unit 132 to operate in this way, the delivery destination user can notice a high-accuracy arrival date and time of the delivery target article. In addition, the delivery source user changes a time for delivery using the moving body M on the basis of weather conditions or taking-off/landing conditions, whereby the delivery target article can be securely delivered.

In a case in which the information receiving unit 131 receives unlock date and time information, the notification unit 132 may notify a delivery source information terminal 1 used by a delivery source user corresponding to the delivery source ID of the unlock date and time information. In a case in which the information receiving unit 131 acquires unlock date and time information and reception confirmation information in association with each other, the notification unit 132 may notify a delivery source information terminal 1 used by a delivery source user corresponding to the delivery source ID of the unlock date and time information and the reception confirmation information. By causing the notification unit 132 to operate in this way, the delivery source user can easily check whether or not the delivery destination user has received the delivery target article.

In a case in which the information receiving unit 131 has not received unlock date and time information until a predetermined period elapses from an arrival date and time represented by the arrival date and time information, the notification unit 132 may notify at least one of the delivery destination information terminal 2 and the delivery source information terminal 1 of time-over information representing that the delivery target article has not be taken out of the housing place. The predetermined period is a period in which the housing device L is able to store the delivery target article and, for example, is one week. By causing the notification unit 132 to operate in this way, the delivery source user can notify a delivery destination information terminal 2 used by a delivery destination user such that the delivery destination user quickly receives the delivery target article, and the delivery destination user can quickly receive the delivery target article.

In a case in which the information receiving unit 131 receives delivery instruction information, the notification unit 132 may notify an information terminal used by a person delivering a delivery target article from a housing place to a place designated by the delivery destination user of unlock information used for unlocking the housing place. For example, the unlock information is a password, for example, composed of a plurality of characters or numbers or an information code such as a barcode. A person delivering a delivery target article receives the delivery target article by unlocking the housing place using the unlock information notified from the notification unit 132 and delivers the received delivery target article to a place designated by the delivery destination user.

In a case in which the information receiving unit 131 receives a delivery destination user ID, an article ID, and return notification information, the notification unit 132 may notify a delivery source information terminal 1 used by a delivery source user of return of a delivery target article corresponding to the article ID from a delivery destination user represented by the delivery destination user ID. By causing the notification unit 132 to operate in this way, for example, the delivery source user can cause a moving body M flying through a return path from the housing device L to the flying object port P to return the delivery target article represented by the article ID associated with the return notification information.

The notification unit 132 may transmit at least one of the state information or the position information stored by the storage unit 12 to the delivery destination information terminal 2 for every predetermined time interval. For example, in a case in which it is before start of flight of the moving body M, the notification unit 132 notifies the delivery destination information terminal 2 of "stopped" represented by the state information stored by the storage unit 12. In a case in which the moving body M is flying, the notification unit 132 notifies the delivery destination information terminal 2 of the position represented by the position information stored by the storage unit 12. In a case in which instruction information used for acquiring the state information or the position information of the moving body M is acquired from the delivery destination information terminal 2, the notification unit 132 may transmit the state information or the position information. By causing the notification unit 132 to operate in this way, the delivery destination user can notice the position of the delivery target article in real time.

For example, in a case in which a plurality of article IDs are associated with a delivery destination user ID, the notification unit 132 may notify a delivery destination information terminal 2 used by a delivery destination user represented by the delivery destination user ID of information used for checking whether a plurality of delivery target articles represented by the plurality of article IDs are to be stored in the same housing place. In a case in which information used for giving an instruction for storing a plurality of delivery target articles in the same housing place is received by the information receiving unit 131, the notification unit 132 determines whether or not a period in which the plurality of delivery target articles are stored is over a predetermined period and, in a case in which the period is not over the predetermined period, notifies the delivery source information terminal 1 such that the plurality of delivery target articles are stored in the same housing place.

By causing the notification unit 132 to operate in this way, the delivery destination user can receive the plurality of delivery target articles from the same housing place at the same time. In addition, the plurality of delivery target articles may be delivered either by a delivery means different from the moving body M or by the moving body M.

[Operation Sequence of Information Processing System S]

Figure 5:
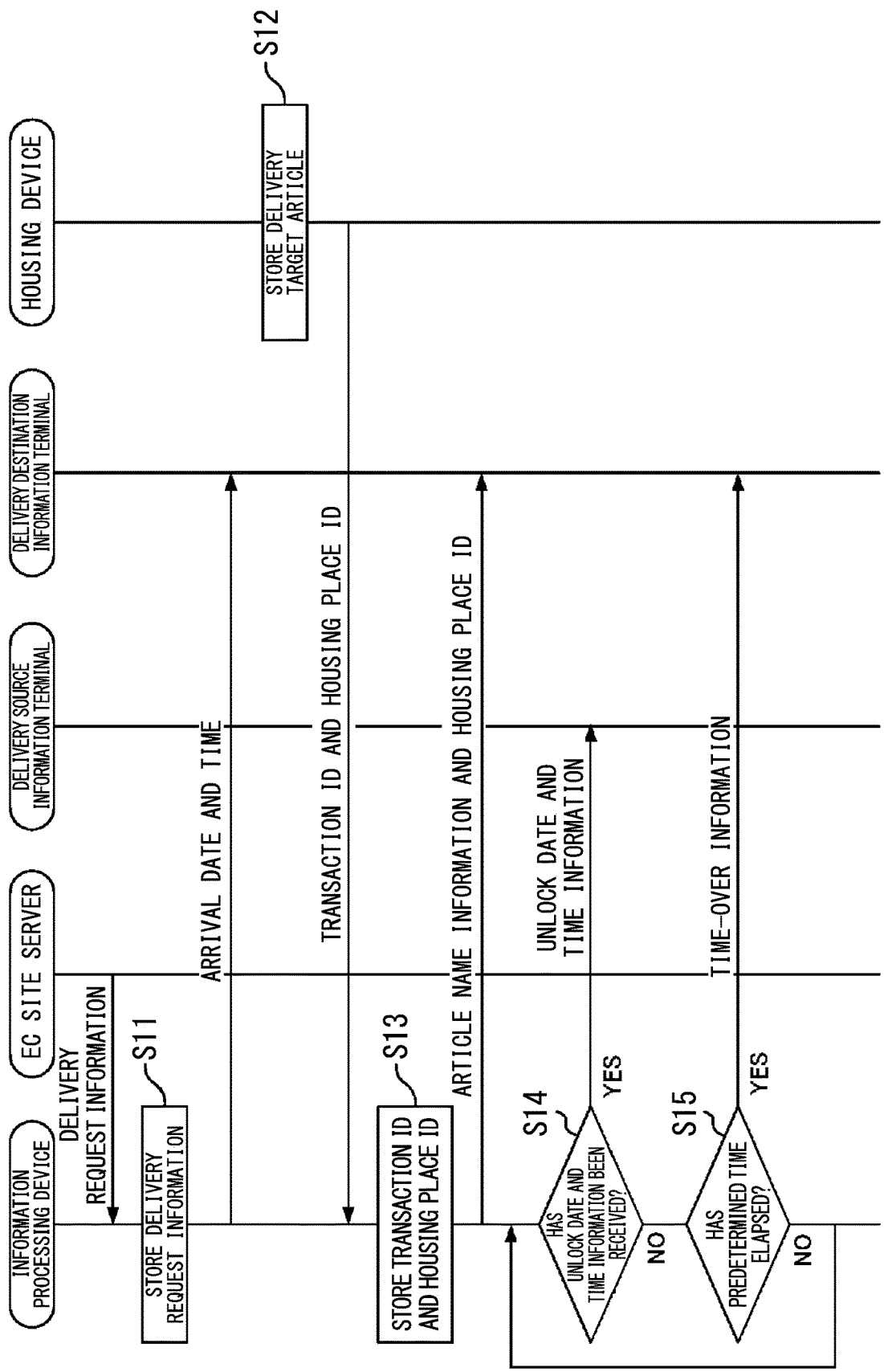
FIG. 5 is a sequence diagram illustrating an example of the flow of operations of the information processing system S.

FIG. 5 is a sequence diagram illustrating an example of the flow of operations of the information processing system S. The sequence diagram illustrated in FIG. 5 illustrates the flow of operations performed in a case in which a delivery destination user receives a delivery target article requested to be delivered by a delivery source user from a housing place of the delivery target article.

In the information processing device 10, the information receiving unit 131 receives delivery request information transmitted from the EC site server 100 and causes the storage unit 12 to store the received delivery request information (S11). The notification unit 132 notifies the delivery destination information terminal 2 of an arrival date and time between a time at which the moving body M is determined to fly and a time at which the moving body M starts to fly.

The moving body M stores a delivery target article in a housing device L (S12). After the moving body M stores the delivery target article, the housing device L notifies the information processing device 10 of a transaction ID and a housing place ID. In the information processing device 10, the information receiving unit 131 stores the transaction ID and the housing place ID received from the housing device L in the storage unit 12 (S13). The notification unit 132 notifies the delivery destination information terminal 2 of article name information associated with the article ID stored by the storage unit 12, a position of the housing device L corresponding to the housing place ID, and a housing place in the housing device L.

In the information processing device 10, in a case in which the information receiving unit 131 receives unlock date and time information from the housing device L (Yes in S14), the notification unit 132 notifies the delivery source information terminal 1 of the unlock date and time information. In a case in which the information receiving unit 131 has not received unlock date and time information from the housing device L (No in S14), when a predetermined time has elapsed after a date and time at which the housing device L stores the delivery target article (Yes in S15), the notification unit 132 notifies the delivery destination information terminal 2 of time-over information. On the other hand, when the predetermined time has not elapsed after the date and time at which the housing device L stores the delivery target article (No in S15), the notification unit 132 repeats the processes of S14 to S15.

[Flowchart of Information Processing Device 10]

Figure 6:
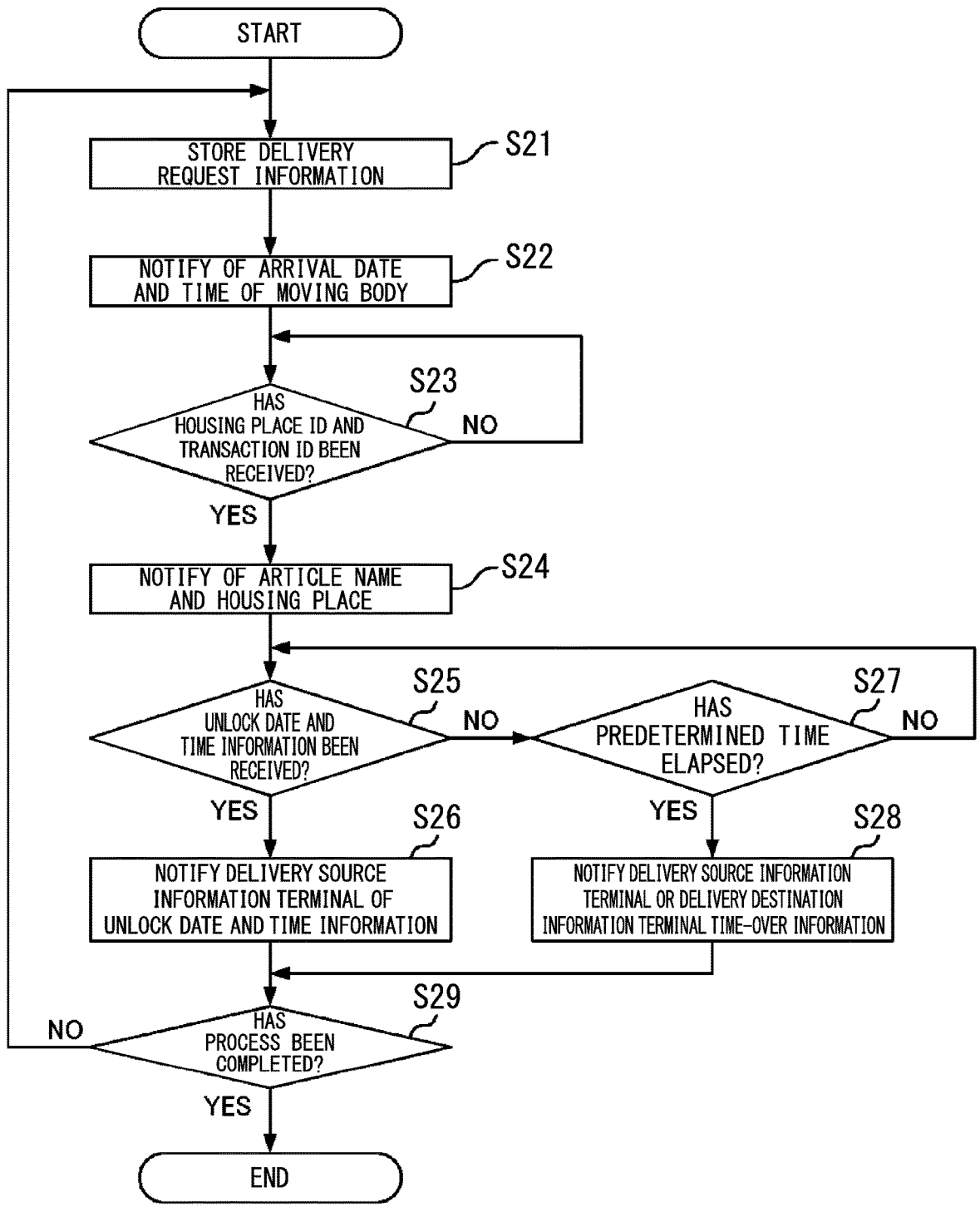
FIG. 6 is a flowchart illustrating an example of operations of the information processing device 10.

FIG. 6 is a flowchart illustrating an example of operations of the information processing device 10. The flowchart illustrated in FIG. 6 illustrates operations performed until the information processing device 10 notifies the delivery source information terminal 1 or the delivery destination information terminal 2 of unlock date and time information or time-over information after receiving delivery request information.

When delivery request information is received from the EC site server 100, the information receiving unit 131 causes the storage unit 12 to store the delivery request information (S21). The notification unit 132 notifies the delivery destination information terminal 2 of an arrival date and time of the moving body M represented by date and time information included in the delivery request information (S22). While a housing place ID and a transaction ID have not been received from the housing device L (No in S23), the information receiving unit 131 waits for transmission of the housing place ID and the transaction ID from the housing device L. On the other hand, in a case in which a housing place ID and a transaction ID have been received from the housing device L (Yes in S23), the information receiving unit 131 notifies the delivery destination information terminal 2 of article name information associated with the transaction ID and a housing place in a housing device L corresponding to the housing place ID (S24).

In a case in which the information receiving unit 131 has received unlock date and time information from the housing device L (Yes in S25), the notification unit 132 notifies the delivery source information terminal 1 of the unlock date and time information (S26). On the other hand, in a case in which the information receiving unit 131 has not received unlock date and time information from the housing device L (No in S25), when a predetermined time has elapsed after a date and time at which the housing device L stores the delivery target article (Yes in S27), the notification unit 132 notifies the delivery source information terminal 1 or the delivery destination information terminal 2 of time-over information (S28). In a case in which the information receiving unit 131 has not received unlock date and time information from the housing device L (No in S25), when a predetermined time has not elapsed after the date and time at which the housing device L stores the delivery target article (No in S27), the information receiving unit 131 waits for reception of unlock date and time information from the housing device L.

In a case in which an operation for ending the process is not performed (No in S29), the information processing device 10 repeats the processes of S21 to S29. On the other hand, in a case in which an operation for ending the process is performed (Yes in S29), the information processing device 10 ends the process.

MODIFIED EXAMPLE

In the description presented above, although an operation of the housing device L transmitting a housing place ID representing a housing place storing a delivery target article to the information processing device 10 after the moving body M storing the delivery target article in the housing place has been described as an example, the information processing device 10 may specify a housing place in which the delivery target article is stored before the moving body M starts delivery and notify the moving body M of a housing place ID representing the housing place.

In such a case, the information processing device 10 acquires a housing place ID of a vacant housing place among a plurality of housing places included in the housing device L from the housing device L. The information processing device 10 transmits the acquired housing place ID and a transaction ID associated with the delivery target article to the moving body M. The information processing device 10 may transmit the housing place ID acquired from the housing device L to the delivery destination information terminal 2.

By causing the information processing device 10 to operate in this way, the information processing device 10 can deliver the delivery target article to the moving body M in a state in which the housing place of the delivery target article is secured. As a result, an article delivered by another moving body M is housed in a housing place included in a housing device L selected as a delivery destination, whereby the information processing device 10 can prevent the moving body M from being unable to house a delivery target article in the delivery destination.

[Effect of Information Processing Device 10]

As described above, the information processing device 10 includes: the storage unit 12 that stores an article ID used for identifying a delivery target article that is a target to be delivered, article name information representing an article name of the delivery target article, a delivery destination user ID used for identifying a delivery destination user of the delivery target article, delivery destination information representing a delivery destination of the delivery target article, and arrival date and time information representing a date and time at which a moving body delivering the delivery target article arrives at the delivery destination in association with each other; and the information receiving unit 131 that causes the storage unit 12 to store a housing place ID in association with an article ID when the housing place ID representing a housing place of the delivery target article delivered to the delivery destination and the article ID of the delivery target article are received.

Then, the notification unit 132 notifies a delivery destination information terminal used by a delivery destination user represented by the delivery destination user ID of an arrival date and time represented by the arrival date and time information, an article name of the delivery target article corresponding to the article ID, and a housing place corresponding to the housing place ID, and accordingly, the delivery destination user can notice a date and time and a place at which the delivery target article can be received. As a result, the delivery destination user can receive the delivery target article in accordance with situations of the delivery destination user even when he or she is absent at a time at which the delivery target article is delivered.

In addition, the present invention can contribute to Goal 9 "Build resilient infrastructure, promote inclusive and sustainable industrialization, and foster innovation" of sustainable development goals (SDGs) lead by U.N.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, all or a part of each device can be configured to be distributed or integrated functionally or physically in arbitrary units. In addition, a new embodiment formed by arbitrarily combining a plurality of embodiments belongs to an embodiment of the present invention as well. The effects of the new embodiment formed through combination include the effects of the original embodiment.

What is claimed is:

1. An information processing device comprising:
at least one memory configured to store instructions; and
at least one processor configured to execute the instructions, wherein
the at least one memory is configured to store article identification information used for identifying a delivery target article that is a target to be delivered, article name information representing an article name of the delivery target article, delivery destination user identification information used for identifying a delivery destination user of the delivery target article, delivery destination information representing a delivery destination of the delivery target article, arrival date and time information representing a date and time at which a moving body delivering the delivery target article arrives at the delivery destination, and moving body identification information used for identifying the moving body in association with each other,
the at least one processor is configured to execute the instructions to:
notify a delivery destination information terminal used by the delivery destination user represented by the delivery destination user identification information of an arrival date and time represented by the arrival date and time information before the moving body starts to move to deliver the delivery target article represented by the article identification information to the delivery destination represented by the delivery destination information;
store housing place identification information in the at least one memory in association with the article identification information when the housing place identification information used to identify a housing place of the delivery target article delivered to the delivery destination and information used for specifying the delivery target article are received;
transmit, to the moving body, an instruction which controls the moving body to deliver the delivery target article represented by the article identification information to the delivery destination represented by the delivery destination information in the housing place identified by the housing place identification information based on the arrival date and time represented by the arrival date and time information; and
notify, when movement stop information representing cessation of movement of the moving body corresponding to the moving body identification information is stored in the at least one memory, the delivery destination information terminal of information used for accepting an instruction of selection of a delivery means using a moving body of a different type from the moving body.

2. The information processing device according to claim 1,
wherein the at least one memory is configured to store moving body identification information used for identifying the moving body in association with the article identification information, and
wherein the at least one processor is configured to execute the instructions to notify, when movement stop information representing cessation of movement of the moving body corresponding to the moving body identification information is stored in the at least one memory, the delivery destination information terminal used by the delivery destination user corresponding to the delivery destination user identification information associated with the moving body identification information of a change of a delivery schedule of the delivery target article.

3. The information processing device according to claim 1,
wherein the at least one processor is configured to execute the instructions to notify, when movement stop information representing cessation of movement of the moving body corresponding to the moving body identification information is stored in the at least one memory, the delivery destination information terminal of information used for accepting a delivery stop instruction.

4. The information processing device according to claim 1,
wherein the at least one memory is configured to store delivery source identification information used for identifying a delivery source user of the delivery target article in association with the article identification information,
wherein the at least one processor is configured to execute the instructions to:
receive unlock date and time information representing a date and time at which the housing place corresponding to the housing place identification information is unlocked; and
notify a delivery source information terminal used by the delivery source user corresponding to the delivery source identification information of the unlock date and time information.

5. The information processing device according to claim 4, wherein, in a case in which the unlock date and time information is not received until a predetermined period elapses after the arrival date and time represented by the arrival date and time information, the at least one processor is configured to execute the instructions to notify at least one of the delivery source information terminal and the delivery destination information terminal of time-over information representing that the delivery target article has not been taken out of the housing place.

6. The information processing device according to claim 1,
wherein the at least one processor is configured to execute the instructions to receive delivery instruction information representing an instruction for delivery of the delivery target article to a place designated by the delivery destination user, and
wherein, in a case in which the delivery instruction information is received, the at least one processor is configured to execute the instructions to notify an information terminal used by a person delivering the delivery target article from the housing place to the place designated by the delivery destination user of unlock information used for unlocking the housing place.

7. The information processing device according to claim 1, wherein the at least one processor is configured to execute the instructions to:
receive change information representing that an arrival date and time of the moving body has been changed; and
notify, when the change information is received, a delivery source information terminal used by a delivery source user and the delivery destination information terminal of a changed arrival date and time represented by the change information.

8. The information processing device according to claim 1,
wherein the at least one processor is configured to execute the instructions to:
cause, when the delivery destination user identification information, the article identification information, and return notification information representing return of the delivery target article corresponding to the article identification information are received, the at least one memory to store the delivery destination user identification information, the article identification information, and the return notification information that have been received, and
notify a delivery source information terminal used by a delivery source user of return of the delivery target article corresponding to the article identification information from the delivery destination user represented by the delivery destination user identification information.

9. The information processing device according to claim 1,
wherein the at least one memory is configured to store at least one of weather information of a delivery source and weather information of the delivery destination of the delivery target article, or availability information representing availability of taking-off at the delivery source or availability of landing at the delivery destination in association with the article identification information, and
wherein the at least one processor is configured to execute the instructions to notify, in a case in which the weather information or the availability information satisfies a predetermined condition, at least one of the delivery source information terminal used by the delivery source user and the delivery destination information terminal of information relating to a change of the arrival date and time.

10. An information processing method using a computer, the information processing method comprising:
causing a storage unit to store article identification information used for identifying a delivery target article that is a target to be delivered, article name information representing an article name of the delivery target article, delivery destination user identification information used for identifying a delivery destination user of the delivery target article, delivery destination information representing a delivery destination of the delivery target article, arrival date and time information representing a date and time at which a moving body delivering the delivery target article arrives at the delivery destination, and moving body identification information used for identifying the moving body in association with each other;
notifying a delivery destination information terminal used by the delivery destination user represented by the delivery destination user identification information of an arrival date and time represented by the arrival date and time information before the moving body starts to move to deliver the delivery target article represented by the article identification information to the delivery destination represented by the delivery destination information;
storing housing place identification information in the storage unit in association with the article identification information when the housing place identification information used for identifying a housing place of the delivery target article delivered to the delivery destination and information used for specifying the delivery target article are received;
transmitting, to the moving body, an instruction which controls the moving body to deliver the delivery target article represented by the article identification information to the delivery destination represented by the delivery destination information in the housing place identified by the housing place identification information based on the arrival date and time represented by the arrival date and time information; and
notifying, when movement stop information representing cessation of movement of the moving body corresponding to the moving body identification information is stored in the storage unit, the delivery destination information terminal of information used for accepting an instruction of selection of a delivery means using a moving body of a different type from the moving body.

11. An information processing system comprising:
an information processing device that notifies an information terminal used by a delivery destination user of delivery completion information of a delivery target article that is a target to be delivered; and
the information terminal that displays the delivery completion information received from the information processing device,
wherein the information processing device includes:
at least one memory configured to store instructions; and
at least one processor configured to execute the instructions, wherein
the at least one memory is configured to store article identification information used for identifying the delivery target article, article name information representing an article name of the delivery target article, delivery destination user identification information used for identifying the delivery destination user of the delivery target article, delivery destination information representing a delivery destination of the delivery target article, arrival date and time information representing a date and time at which a moving body delivering the delivery target article arrives at the delivery destination, and moving body identification information used for identifying the moving body in association with each other,
the at least one processor is configured to execute the instructions to:
notify the delivery destination information terminal used by the delivery destination user represented by the delivery destination user identification information of an arrival date and time represented by the arrival date and time information before the moving body starts to move to deliver the delivery target article represented by the article identification information to the delivery destination represented by the delivery destination information;
store housing place identification information in the at least one memory in association with the article identification information when the housing place identification information used for identifying a housing place of the delivery target article delivered to the delivery destination and information used for specifying the delivery target article are received;

transmit, to the moving body, an instruction which controls the moving body to deliver the delivery target article represented by the article identification information to the delivery destination represented by the delivery destination information in the housing place identified by the housing place identification information based on the arrival date and time represented by the arrival date and time information; and notify, when movement stop information representing cessation of movement of the moving body corresponding to the moving body identification information is stored in the at least one memory, the information terminal of information used for accepting an instruction of selection of a delivery means using a moving body of a different type from the moving body, and wherein the information terminal includes a display configured to display the arrival date and time, the article name, and the housing place notified from the information processing device.

12. The information processing device according to claim 1, wherein the at least one processor is configured to execute the instructions to:

before the moving body starts to move to deliver the delivery target article represented by the article identification information to the delivery destination represented by the delivery destination information, acquire vacancy information representing a vacancy status of a plurality of housing places;

acquire housing place identification information of the housing place in which the vacancy status indicating vacancy among the plurality of housing places;

notify the moving body of the acquired housing place identification information; and notify the delivery destination information terminal used by the delivery destination user represented by the delivery destination user identification information of the acquired the housing place identification information and the arrival date and time represented by the arrival date and time information.

13. The information processing device according to claim 1, wherein the at least one processor is configured to execute the instructions to:

notify, when a plurality of pieces of article identification information are associated with the delivery destination user identification information, the delivery destination information terminal of a confirmation instruction for checking whether or not a plurality of delivery target articles represented by the plurality of pieces of article identification information to be stored in a same housing place; and in a case in which an instruction for storing the plurality of delivery target articles in the same housing place is received, notify a delivery source information terminal used by a delivery source user corresponding to delivery source identification information that the plurality of delivery target articles are to be stored in the same housing place, when a period in which the plurality of delivery target articles are stored is not over a predetermined period.

* * * * *